Jan. 3, 1956  S. G. WEBB, JR  2,729,157
ROLLER SEED BED FORMER AND PLANTER
Filed Oct. 15, 1951  4 Sheets-Sheet 3
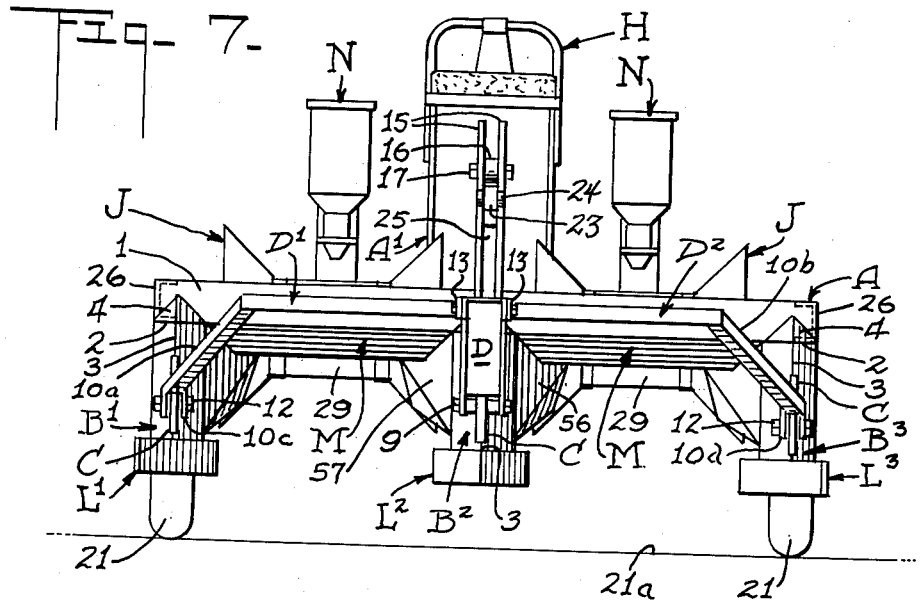
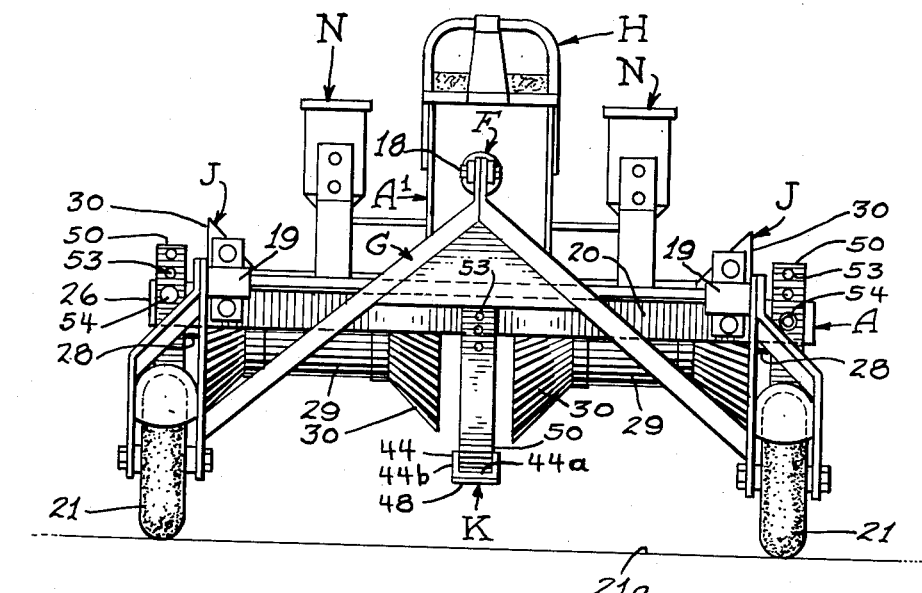
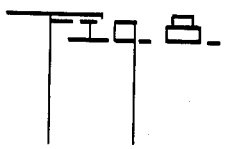
INVENTOR.
SAMUEL G. WEBB, JR.
BY
Munn & Liddy
ATTORNEYS

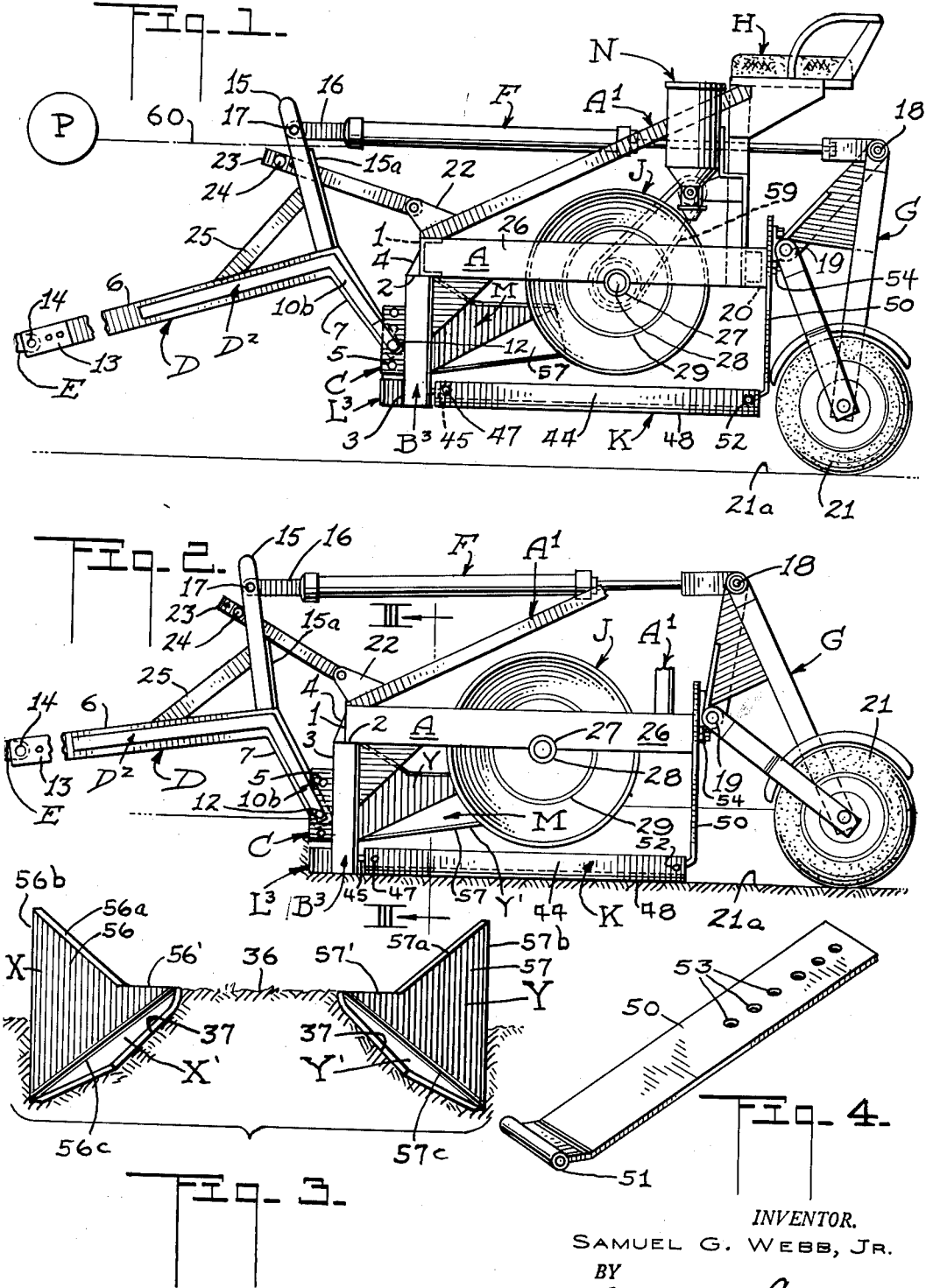

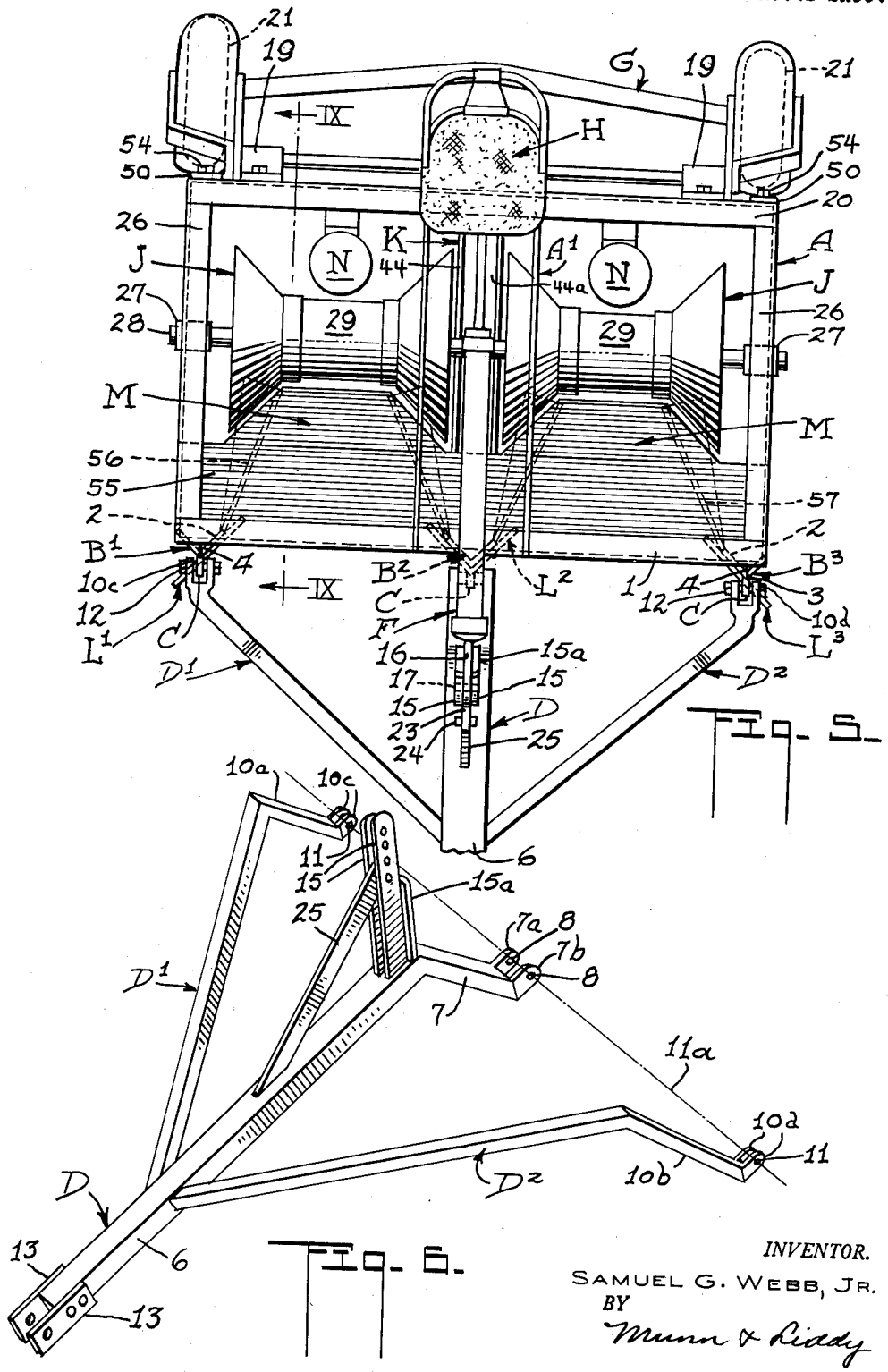

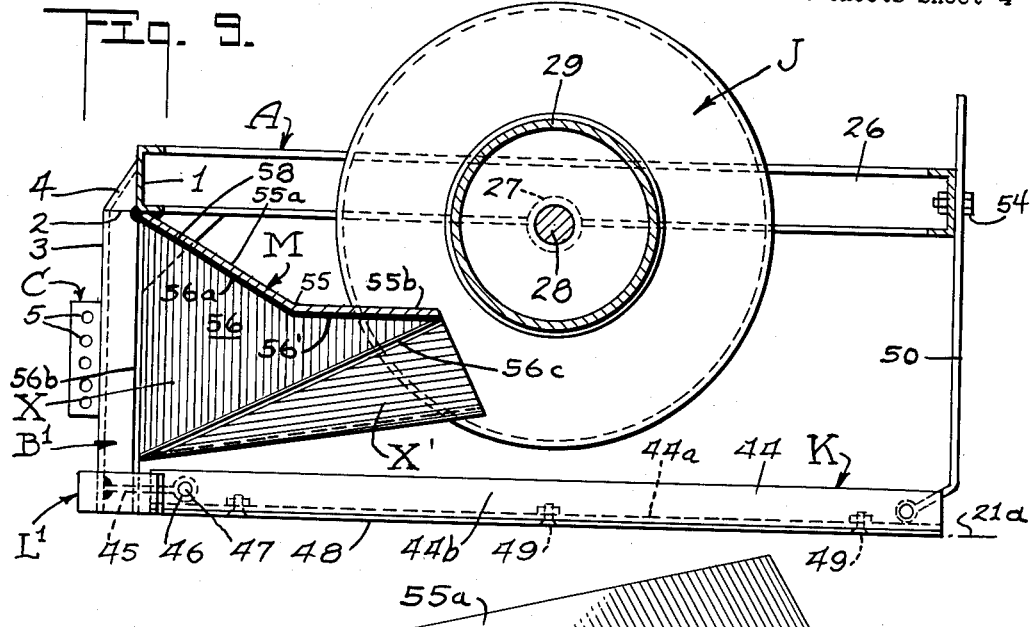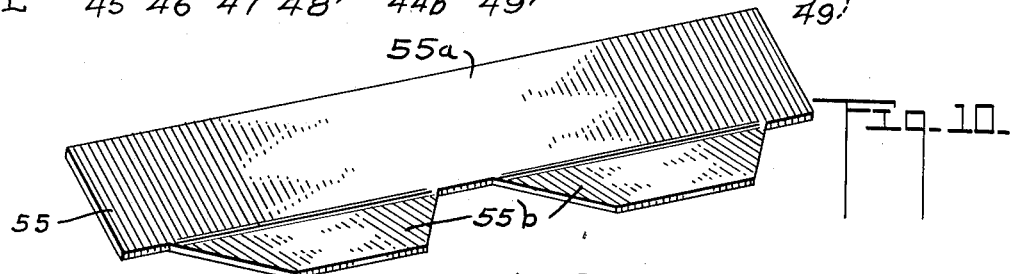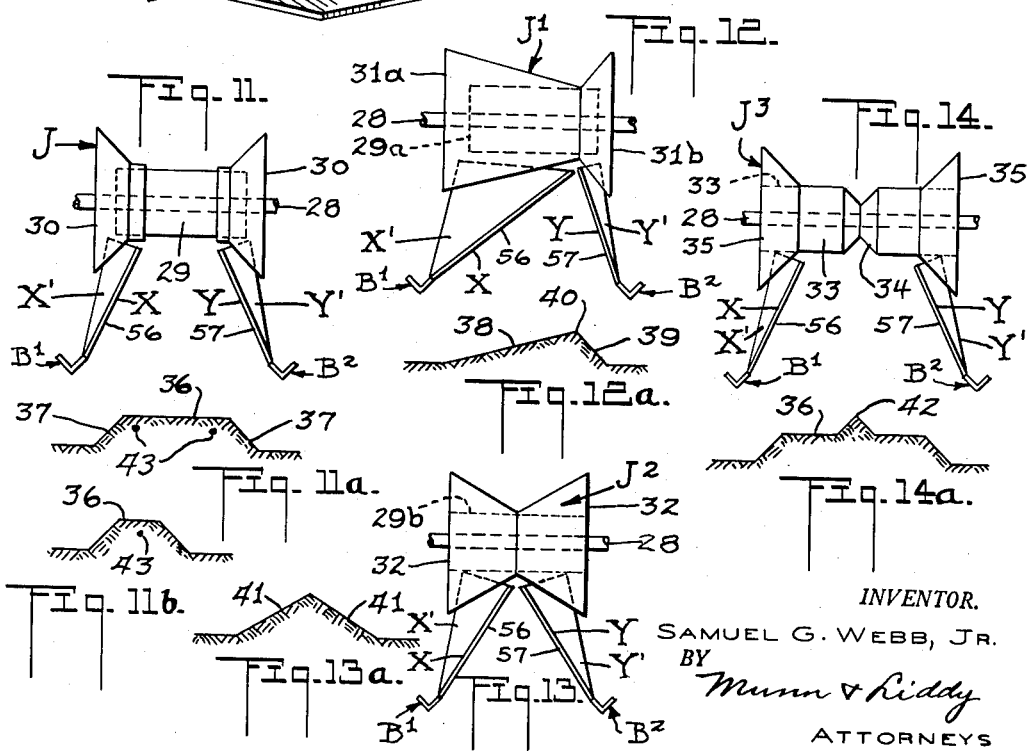

United States Patent Office 2,729,157
Patented Jan. 3, 1956

2,729,157
ROLLER SEED BED FORMER AND PLANTER
Samuel G. Webb, Jr., Holtville, Calif.

Application October 15, 1951, Serial No. 251,348

6 Claims. (Cl. 97—56)

The old type sled bed shaper is dragged over the ground to form long rows of seed beds. Wings are used by this type of shaper, but the beds are shaped and packed by the wings. It requires considerable power to pull a sled bed shaper over the ground and therefore the tractor pulling the device consumes too much gasoline. Moreover, clods of dirt are moved ahead of the machine by the shaper rather than be broken up by it.

The principal object of my invention is to provide a roller seed bed shaper designed to replace the old type sled bed shaper. Seed bed forming rollers of the desired shape are rotatably carried by the machine and form as many seed beds as there are rollers. The rollers carry adjustable flanges which permit the width of the seed bed to be regulated as desired.

I employ wings for guiding the dirt to the rollers as the machine advances over the ground. The wings do not pack the dirt as is true in the sled type of bed shaper, but only retain the dirt until it starts through the rollers. The rollers do all of the packing. The roller seed bed planter has advantages over the sled bed shaper in being of a lighter draft. The planter will not drag clods of dirt over the ground as does the sled bed shaper, but it will break them up, and it will pack firmer beds. There are fewer wearing parts in the planter than in the shaper and there is a saving in gasoline because the planter rolls over the ground, whereas the sled bed shaper is dragged over the ground. Is the planter, the seed bed is rolled after planting and the seed beds thus formed are of a more uniform height.

A further object of my invention is to provide a device of the type described which is simple in construction, and durable and efficient for the purpose intended.

Other objects and advantages will appear in the following specification, and the novel features of the device will be particularly pointed out in the appended claims.

My invention is illustrated in the accompanying drawings forming a part of this application, in which:

Figure 1 is a side elevation of my roller planter with the seed bed forming rollers and control shoe assemblies held in raised position for ready transporting of the machine;

Figure 2 is a view similar to Figure 1, but shows the frame lowered so that the control shoe assemblies and the seed bed forming rollers will contact with the ground;

Figure 3 is a rear view of the dirt directing and restricting throat member associated with each seed bed forming roller and is a transverse section taken along the line III—III of Figure 2;

Figure 4 is a perspective view of an adjustable part used in the control shoe assemblies;

Figure 5 is a top plan view of the machine;

Figure 6 is a perspective of the tongue or lift hitch that connects the machine with a powered vehicle;

Figure 7 is a front elevation of the device;

Figure 8 is a rear elevation of the device;

Figure 9 is an enlarged longitudinal section taken along the line IX—IX of Figure 5 and illustrates the dirt directing and restricting throat in its relation with a seed bed former;

Figure 10 is an isometric view of the top plate of the dirt directing and restricting throat;

Figure 11 is a top plan diagrammatic view of the seed bed forming roller illustrated in Figures 1, 2, 5, 7 and 8;

Figures 11a and 11b are cross sectional views of the type of seed bed formed by the roller shown in Figure 11;

Figure 12 is a top plan view of a modified form of seed bed forming roller;

Figure 12a is a cross sectional view of the seed bed formed by the roller in Figure 12;

Figure 13 is a top plan view of a second modified form of seed bed forming roller;

Figure 13a is a cross sectional view of a seed bed formed by the roller in Figure 13;

Figure 14 is a top plan view of a third modified form of seed bed forming roller; and Figure 14a is a cross sectional view of the seed bed formed by the roller shown in Figure 14.

While I have shown only the preferred forms of my invention, it should be understood that various changes or modifications may be made within the scope of the appended claims without departing from the spirit and scope of the invention.

In carrying out my invention, I provide a main frame indicated generally at A and this frame is preferably rectangular in shape and formed of channel-irons, see the plan view of the frame in Figure 5. The front channel iron 1 of the frame has three legs B1, B2 and B3 extending downwardly therefrom. The legs are angle shaped in horizontal cross section and have their upper edges 2 welded or otherwise secured to the underside of the front channel-iron 1, see Figures 2 and 5. The vertex edge 3 of the legs extends in front of the channel iron 1 a slight distance and angle gussets 4 are placed on the exposed portions of the top edges 2 and are welded to the top edges of the legs as well as to the front face of the channel-iron 1. In this way a covered top for each leg is provided.

In Figure 5 I illustrate the legs B1 and B3 as being placed at the ends of the front channel-iron 1 while the leg B2 is placed midway therebetween. The legs B1, B2 and B3 have plates C, see Figures 2 and 9, which are welded to the vertex edges 3 of the legs and project forwardly as indicated for the purpose of pivotally supporting the tongue D. The plates C have a vertical row of openings 5 provided therein, see Figure 9.

The tongue D is shown in perspective in Figure 6 and it has a central elongated member 6. Figures 1 and 6 disclose this member as having a downwardly inclined portion 7 with parallel lugs 7a and 7b spaced a slight distance apart. The lugs 7a and 7b have aligned openings 8 therein for receiving a pivot bolt 9, see Figure 7, by means of which the central member of the tongue is pivotally connected to the plate C on the central leg B. Again referring to Figure 6, it will be seen that the tongue D has lateral bracing members D1 and D2 that extend from the sides of the tongue toward the front channel 1 of the frame A. The bracing members D1 and D2 have downwardly inclined portions 10a and 10b. The free ends of the portions 10a and 10b carry pairs of lugs 10c and 10d that are also provided with aligned openings 11. The openings 11 are in alignment with the openings 8 as indicated by the dot dash line 11a in Figure 6. Figures 1 and 7 illustrate bolts 12 passed through the openings 11 in the lugs 10c and 10d and through any one of the desired openings 5 in the plates C, whereupon the tongue is pivotally secured to the frame A.

At the front of the central member D I provide clevis plates 13, see Figure 6, that are designed to receive a pivot bolt 14, see Figure 1, that pivotally connects the tongue D to a pulling vehicle such as a tractor E. Again referring to Figures 1, 2 and 6, I show the central member 6 of the tongue D provided with a pair of upwardly-extending guide members 15—15 and a hydraulic ram F has an end 16 pivotally connected to the members at the desired position by a pivot bolt 17. A backing member 15a and a strut 25 reinforce the members 15.

It is best now to set forth how the other end of the hydraulic ram F is pivotally connected at 18 with a rear wheel supporting carriage G. The carriage G is pivoted at 19 to the rear channel 20 of the main frame A, see Figure 1. Reference to Figures 1 and 2 illustrate how the hydraulic ram F when extended will swing the carriage G about its pivots 19 for moving the rear wheels 21 downwardly and lifting the frame A with respect to the ground line 21a. During the extension of the hydraulic ram F, the carriage G is not only swung about its pivot in a clockwise direction, but in addition the tongue D is swung about its pivot line 11a in a counter-clockwise direction.

I provide novel means for limiting the distance the frame A is lifted above the ground. The channel A carries lugs 22, see Figure 1, for pivotally receiving a link bar 23. The free end of the bar is slidably received between the pair of upright members 15 and a bolt 24 is carried by the free end of the bar and is designed to contact with the left hand edges of the pair of uprights 15 in Figure 1 when the tongue D has been swung counter-clockwise to the desired extent. The purpose of the bar 23 is to control the height of the lift of the machine when raised above the ground. The bar 23 floats between the parallelly spaced members 15. By placing the stop pin 24 in the desired hole at the end of the bar 23, the height of the lifting of the machine may be controlled.

The frame A is provided with an operator's seat H and this seat is supported by an auxiliary frame A1 that projects above the main frame and positions the seat substantially above the rear channel member 20. Both Figures 1 and 2 disclose the lugs 22 being connected to the auxiliary frame A1.

Before describing the runners for the control shoes for supporting the frame A the desired distance above the ground, it is best to set forth the construction of the bed-forming rollers J. The sides 26 of the main frame carry bearings 27 through which a shaft 28 is passed. In Figure 5 the bearings 27 are indicated as well as the shaft 28 and I disclose two seed bed-forming rollers J, mounted on the shaft, although I do not wish to be confined to any particular number of rollers. Each seed bed-forming roller is composed of a cylindrical member 29, see Figure 11, and conical shaped ends 30 that are adjustably mounted on the member and secured thereto. The conical ends can be moved toward each other for shortening the length of the roller and they likewise may be moved away from each other to the greatest extent made possible by the dimensions of the machine and the length of the cylindrical member 29.

It is possible to have rollers of different shapes and I illustrate three modified forms of rollers J1, J2 and J3, in Figures 12, 13 and 14. The flanges or conical-shaped ends 31a and 31b of the roller J1 illustrated in Figure 12 are shaped differently from the ends 30 of the roller already described. A cylindrical member 29a shown in Figure 12 has a large conical-shaped member 31a adjustably mounted thereon as well as a smaller conical-shaped member 31b. These two members are brought into abutting relation on the cylinder 29a so as to form a roller J1 of the type illustrated in Figure 12.

In Figure 13, another form of roller J2 is illustrated. In this form of roller the conical members 32 are both of the same size and shape and are brought into abutting relation on the cylindrical member 29b. In Figure 14, the roller J3 has a central cylindrical portion 33 with a V-shaped annular groove 34 provided midway between its ends. Conical ends 35 are adjustably mounted on the cylindrical portion 33 to make the roller shape as indicated.

In Figures 11a, 11b, 12a, 13a and 14a, I illustrate the tops of differently shaped seed beds formed by the rollers J, J1, J2 and J3, respectively, as they are moved over the ground 21a. The roller J will make the seed bed of the shape shown at Figs. 11a and 11b, while the roller J1 will make the seed bed of the cross sectional shape shown in Figure 12a. In like manner the roller J2 will make a seed bed of the shape shown at Figure 13a and the roller J3 will make a seed bed of the cross sectional shape shown at Figure 14a. In the seed bed illustrated in Figure 11a, the top 36 of the bed is fashioned by the cylinder 29 of the roller, while the inclined sides 37 of the same bed are formed by the conical ends 30. The seed bed shown in Figure 12a and formed by the roller J1 is angularly shaped in cross section and has a long sloping side 38 with a short sloping side 39, the two sides meeting to form a vertex or ridge 40 at the top of the seed bed.

A slightly differently shaped seed bed in Figure 13a is formed by the roller J2 and the two sides 41 of this bed are of the same size and have the same angular slope. The seed bed shown in Figure 14a is somewhat similar to the one shown in Figure 11a, except that the top 36 of this bed has a raised central ridge 42 formed by the annular recess 34 in the cylinder 33. It is possible to show additional types of rollers and the seed beds formed thereby, but the three modifications illustrated are sufficient by way of example. It is possible to plant two rows of seeds 43 in the seed beds if desired, see Figure 11a. In Figure 11b the top 36 of the seed bed has been reduced in width to accommodate a single row of seeds 43.

I will now describe the control shoe or runners for determining the position the rollers J will take with respect to the ground line 21a when the machine is supported by the control shoe runners. In Figure 9 the elongated control shoe runner is indicated generally at K. Three control shoes are provided, one being mounted behind each of the legs B1, B2, and B3. In Figure 9 the control shoe K is mounted in back of the leg B1 and it comprises a channel shaped member 44 that has a length substantially equal to the distance between the front and rear channels 1 and 20 of the frame A. At the lower end of the leg B1, I provide a rearwardly extending hinge plate 45 that is preferably welded or otherwise secured to the leg. The channel 44 has its sides extending upwardly from the web 44a and the channel sides 44b have aligned openings 46 for receiving a hinge pin 47 that pivotally connects the channel to the hinge plate 45. A wear plate or runner 48 has a length equal to the length of the channel and it is secured to the underside or web of the channel-shaped member 44a by bolts 49 or other suitable fastening means.

At the rear of the channel 44, I provide an adjustable strap 50 and reference is made to Figure 4 to show the construction of the strap. The strap 50 has a sleeve 51 formed at its lower end and designed to receive a pivot pin 52, see Figure 9, that pivotally connects the strap to the rear end of the channel 44. The strap also has a plurality of openings 53 arranged in a row and a bolt 54 may be passed through any one of the desired openings 53 and then connected to the rear channel 20 of the frame A.

In Figure 9 the channel 44 of the control shoe K substantially parallels the plane of the frame A and therefore the roller J will be disposed a predetermined distance above the ground line 21a. The ground line 21a is determined by the plowshare L provided at the bottom of each leg B. A plowshare L is placed in front of each control shoe K. Figures 5 and 7 illustrate the leg B1 carrying a single flat plowshare L1 inclined at an angle for directing the dirt toward the roller J. The leg B2 carries a V-shaped plowshare L2, while the leg B3 carries a single flat plowshare L3 which is inclined at the opposite angle from that of the plowshare L1 and directs the dirt toward the other roller J. The purpose of the plowshares is to dig into the ground and convey the dirt toward the dirt directing and restricting throat indicated generally at M, see Figure 9.

The dirt directing and restricting throat M comprises a top member 55 of the shape shown in Figures 9 and 10, and two side wings 56 and 57 of the shape shown in Figures 3, 9 and 11. Again referring to Figure 9, it will be seen that the top member 55 has a downwardly inclined portion 55a and a horizontally disposed portion 55b. Figure 3 illustrates a rear view of the wings 56 and 57 when looking in the direction of the arrows III—III of Figure 2, and they have downwardly inclined upper edges 56a and 57a that extend rearwardly and downwardly from the tops of the front edges 56b and 57b of the wings or guides. The front edges of the wings are secured to the legs B1 and B2 as clearly shown in Figures 5 and 11. Although the front edges 56b and 57b of the wings 56 and 57 are shown in Figure 11 as abutting certain of the edges of the V-shaped legs B1 and B2, in actual practice the front portions of the wings will overlie the front faces of the legs and be secured thereto by bolts, rivets or other suitable fastening means.

The downwardly and rearwardly inclined upper edges 56a and 57a of the wings 56 and 57 are welded at 58 or otherwise secured to the downwardly inclined portion 55a of the top member 55, see Figure 9. Again referring to the rear view of the wings in Figure 3, it will be seen that the upper edges of the wings 56 and 57 have horizontal portions 56' and 57' and these are welded to the horizontal portion 55b of the top member 55. Thus far I have defined the shape of the vertically extending portions X and Y of the wings 56 and 57 which converge toward each other as the wings extend from the legs B1 and B2 toward the roller J, see Figure 11. Therefore the dirt dug up by the plowshares L1 and L2 will be conveyed toward the middle of the roller J by the vertical wall portions X and Y of the wings.

I also provide integral and inclined wing portions X' and Y', see Figure 3, and these will form the sloping sides 37 of the seed bed illustrated in Figure 11a. The purpose of the wings or dirt guides is to direct the dirt toward the roller J and then the roller will complete the forming of the seed bed. Although the roller is not shown in Figure 3, it will cooperate with the wings 56 and 57 and form the top 36 to the seed bed as well as forming the inclined sides 37 of the same seed bed. In Figure 9 I show a side view of the vertical portion X of the wing 56, and this portion not only has the downwardly inclined upper edge front portion 56a and the horizontally disposed upper edge rear portion 56', but in addition the lower edge of the vertical portion X is in the form of a line of a fold or crease 56c that extends upwardly from the bottom of the front wing edge 56b to the rear extremity of the horizontal upper edge 55b. The portion X' of the wing is triangular in shape and it extends outwardly and downwardly at an angle from the vertical portion X.

The two wings 56 and 57 and the top member 55 form the dirt directing and restricting throat M that converges downwardly and inwardly to convey the dirt toward the roller J. In the drawings I have shown two of the throats M, one being provided for each roller J. A description of one is sufficient for both and corresponding parts will be given like reference numerals. It is obvious that as many dirt directing and restricting throats M will be provided for the machine as there are rollers J. This feature of the restricted throat M is a vital part of the invention because the dirt will be conveyed to the rollers J by the members M without the members packing the dirt. Instead, the members will start to shape the dirt into the final form of the seed bed. The rollers will then complete the forming of the seed bed. Before this takes place, however, the seeds 43 will be dropped into the proper places in the bed and will be placed at the desired depth.

I disclose two seed hoppers N in Figure 7 which are of a standard seed planting mechanism and these hoppers will deliver the necessary quantity of seeds to the seed bed as soon as the rollers J are caused to be rotated by being brought into contact with the dirt. In Figure 1, a chain and sprockets connection 59 is indicated for automatically actuating the seed feeding means as soon as the frame A is lowered from the position shown in Figure 1 into that shown in Figure 2. Since the seed feeding mechanism and operating means is of a standard construction, further description of this part of the device need not be given.

I also show in Figure 1 a tank indicated diagrammatically at P. This tank carries a fluid under the desired pressure. The line 60 leads from the tank to the hydraulic ram F. The tank is preferably carried by the tractor E and the operator of the tractor is provided with the usual control mechanism, not shown, for controlling the operation of the hydraulic ram F. It is possible for the operator to feed fluid from the tank B to and from the hydraulic ram F for extending the ram as shown in Figure 1 for lifting the machine above the ground line 21a or for shortening the ram so as to permit the machine to be supported by and ride on the control shoe K.

The height of the seed bed formed by the roller J is determined by the adjustment of the member 50 with respect to the frame A. The member 50 can be raised with respect to the frame and secured in place in its new position by the bolt 54. This adjustment will lower the drum J with respect to the control shoe K and the seed bed formed will be of less height. The opposite is true when the member 50 is moved so as to extend its effective length between the rear of the frame A and the pivot point 52. In this simple way the depth of the seed bed is controlled. It should be kept in mind that all three members 50 are adjusted so as to be of the same effective height at any given time.

In Figures 12, 13 and 14, I not only show different types of rollers J1, J2 and J3, but in addition, I illustrate the different shapes the wings 56 and 57 will take in order to cooperate with the differently shaped rollers. It is not necessary to go into detail as to these changed shapes of wings. The vertical portions of the wings 56 and 57 in Figures 12, 13 and 14 will be referred to by X and Y, respectively, and the inclined portions of the same wings will be referred to by X' and Y'. The function of these wings is the same as that set forth for the wings 56 and 57 illustrated in Figures 1, 2, 3, 5, 7, 9, 10 and 11.

The seed bed can be made from four inches high up to twelve inches merely by raising or lowering the rear ends of the shoes K with respect to the frame A. The rollers J and the frame A are made so that two or more seed beds may be formed. The frame can vary in width from thirty inches up to forty-two inches. I do not wish to be confined to any particular width.

In single row planting, the seeds are placed at the center of the bed while in double row planting, the seeds are placed at the sides of the bed. The planter hoppers N are driven by the sprockets and automatically start planting as soon as the rollers hit the bed and start rolling. The planting of seeds stops as soon as the rollers are raised above the beds. The planter shoes are bolted on to the back edge of the frame A and the seeds are placed in the beds by the planters.

The wings 56 and 57 do not pack the dirt. They merely convey it to the roller J. The roller does the packing of the dirt after the seeds have been dropped into the seed bed.

I claim:

1. In a device of the type described: a main frame rectangular in shape and having front and rear members; a carriage for raising and lowering this frame; seed bed forming rollers carried by the frame and being rotatable about an axis paralleling the front member; the ends of the rollers flaring outwardly in a conical-shape and the ends of the adjacent rollers being spaced from each other; legs extending downwardly from the front member and being arranged at the ends thereof and at a point that is in line with the space between adjacent rollers; said legs being angular in cross section with the vertex of the angle facing forwardly; elongated ground-engaging control shoes having their front ends pivotally secured to the lower ends of the legs in the back of the vertex, the length of the control shoes being substantially the same as the distance between the front and rear frame members and the shoes slidably supporting the frame above the ground; adjustable supports pivotally connected to the rear of the control shoes and extending upwardly and being adjustably connected to the rear frame member; a tongue for advancing the frame over the ground; and wings having their forward ends secured to the legs and being inclined for directing dirt toward the centers of the rollers; the rollers being positioned between the front and rear frame members and above the control shoes; the supports for the rear ends of the control shoes being adjustably connected to the rear frame member so that this end can be raised or lowered with respect to the shoes and thus raise or lower the rollers with respect to the ground.

2. In a device of the type described; a main frame rectangular in shape and having front and rear members; a seed bed carriage for raising and lowering this frame; seed bed forming rollers carried by the frame between the front and rear members and being rotatable about an axis paralleling the front member; the ends of the rollers flaring outwardly in a conical-shape and the ends of the adjacent rollers being spaced from each other; legs extending downwardly from the front member and being arranged at the ends thereof and at a point that is in line with the space between adjacent rollers; said legs being angular in cross section with the vertex of the angle facing forwardly; elongated ground-engaging control shoes adjustably connected to the legs in back of the vertex and to the rear of the frame for supporting the frame and rollers the desired distance above the ground, thereby determining the depth of the seed beds formed by the rollers; a tongue for advancing the frame over the ground; and wings having their forward ends secured to the legs and being inclined for directing dirt toward the centers of the rollers where the dirt will be shaped into seed beds by the rollers.

3. In a device of the type described; a main frame rectangular in shape and having front and rear members; a carriage for raising and lowering this frame; seed bed forming rollers carried by the frame between the front and rear members and being rotatable about an axis paralleling the front member; the ends of the rollers flaring outwardly in a conical-shape and the ends of the adjacent rollers being spaced from each other; legs extending downwardly from the front member and being arranged at the ends thereof and at a point that is in line with the space between adjacent rollers; said legs being angular in cross section with the vertex of the angle facing forwardly; elongated ground-engaging control shoes adjustably connected to the legs in back of the vertex and to the rear of the frame for supporting the frame and rollers the desired distance above the ground, thereby determining the depth of the seed beds formed by the rollers; a tongue for advancing the frame over the ground; wings having their forward ends secured to the legs and being inclined for directing dirt toward the centers of the rollers where the dirt will be shaped into seed beds by the rollers and ground digging members carried by the legs for directing dirt towards the wings.

4. In a device of the type described: a main frame rectangular in shape and having front and rear horizontally extending members; two seeds bed forming rollers carried by the frame and disposed between the front and rear members and being rotatable about an axis paralleling the front member; the adjacent ends of the rollers being spaced from each other; legs extending downwardly from the front member and being disposed at the ends thereof and at a point that is in line with the space between adjacent rollers; said legs being angular in cross section with the vertex of the angle facing forwardly; elongated ground-engaging, depth-control shoes for the rollers having their front ends pivotally secured to the lower ends of the legs and in back of the vertexes; the length of the control shoes being substantially the same as the distance between the front and rear frame members and the shoes slidably supporting the frame above the ground; adjustable supports pivotally connected to the rear of the control shoes and extending upwardly and being adjustably connected to the rear frame member for positioning the rollers the desired distance above the ground; wings having their forward ends secured to the legs and being inclined for directing dirt toward the rollers; a tongue pivoted to the front of the frame and having its free end connected to a pulling vehicle; a rear wheel supporting carriage pivoted to the rear of the frame and adapted to be swung for moving the ground-engaging wheels toward or away from the ground; a hydraulic ram having one end connected to the tongue and its other end connected to the carriage and being extensible for swinging the carriage and tongue with respect to the frame for lifting it and the shoes above the ground, whereby the frame, rollers and shoes will be supported by the pulling vehicle and the wheels; said hydraulic ram being contractible for swinging the tongue and carriage for lowering the frame until it is supported by the shoes.

5. The combination as set forth in claim 4; and in which ground-digging members are carried by the legs for directing dirt towards the wings; these ground-digging members being disposed in front of and in alignment with the depth-control shoes, whereby said members will provide furrows in the ground in which shoes may be advanced.

6. In a device of the type described; a main frame rectangular in shape, and having front and rear members; a carriage for raising and lowering this frame; seed-bed-forming rollers carried by the frame between the front and rear members thereof, and being rotatable about an axis paralleling the front member; the ends of the rollers flaring outwardly in a conical shape, and the ends of adjacent rollers being spaced from each other; legs extending downwardly from the front member, and being arranged at the ends thereof and at a point that is in line with the space between adjacent rollers; elongate ground-engaging depth-control shoes adjustably connected to the legs in rear of the latter and to the rear of the frame for supporting the frame and rollers the desired distance above the ground, thereby determining the depth of the seed beds formed by the rollers; a tongue for advancing the frame over the ground; wings secured to the legs, and being inclined for directing dirt towards the rollers where the dirt will be shaped into seed beds by the rollers; and ground-digging members carried by the legs for directing dirt towards the wings; these ground-digging members being disposed in front of and in alignment with the depth-control shoes, whereby said members will provide furrows in the ground in which the shoes may be advanced.

References Cited in the file of this patent

UNITED STATES PATENTS

| Number | Name | Date |
|---|---|---|
| 78,665 | Haynie | June 9, 1868 |
| 141,464 | Roy | Aug. 5, 1873 |
| 144,918 | Moore | Nov. 25, 1873 |
| 375,719 | Wyatt | Dec. 27, 1887 |
| 471,863 | Horne et al. | Mar. 29, 1892 |
| 827,587 | Warner | July 31, 1906 |
| 1,339,040 | Parrish | May 4, 1920 |
| 1,879,055 | Boykin | Sept. 27, 1932 |
| 2,019,238 | Shiki | Oct. 29, 1935 |
| 2,190,347 | Austin | Feb. 13, 1940 |
| 2,320,742 | Newkirk | June 1, 1943 |
| 2,684,021 | Ratzlaff | July 20, 1954 |